(12) United States Patent
Ickowicz (10) Patent No.: US 7,720,731 B1
(45) Date of Patent: May 18, 2010

(54) METHOD AND SYSTEM FOR LEASING AND SHARING A GROUP OF GOODS BY A GROUP COMPOSED OF MATCHING NUMBER OF INDIVIDUALS INCLUDING THE SYSTEMATIC ROTATION OF THOSE GOODS BETWEEN THE LESSEES IN PREDETERMINED TIME SLOTS

(76) Inventor: Charles Ickowicz, 458 Reis Ave., Teaneck, NJ (US) 07666

( * ) Notice: Subject to any disclaimer, the term of this patent is extended or adjusted under 35 U.S.C. 154(b) by 1625 days.

(21) Appl. No.: 10/427,455

(22) Filed: May 1, 2003

Related U.S. Application Data (63) Continuation-in-part of application No. 09/873,686, filed on Jun. 4, 2001, now abandoned.

(51) Int. Cl.
*G06Q 40/00* (2006.01)
(52) U.S. Cl. ............................................. 705/35; 705/38
(58) Field of Classification Search ................... 705/35, 705/38
See application file for complete search history.

(56) References Cited

U.S. PATENT DOCUMENTS

| | | |
|---|---|---|
| 4,736,294 A | 4/1988 | Gill et al. |
| 5,699,527 A | 12/1997 | Davidson |
| 5,774,873 A | 6/1998 | Berent et al. |
| 6,041,310 A | 3/2000 | Green et al. |
| 2001/0034690 A1* | 10/2001 | Joseph ......................... 705/37 |
| 2002/0022979 A1* | 2/2002 | Whipp et al. ................... 705/5 |
| 2002/0082860 A1 | 6/2002 | Johnson |
| 2002/0099618 A1* | 7/2002 | Stiberman ..................... 705/26 |
| 2005/0165661 A1* | 7/2005 | Joseph ......................... 705/26 |
| 2007/0260528 A1* | 11/2007 | Ly et al. ....................... 705/26 |

OTHER PUBLICATIONS

Alan Copps, Aug. 12, 1995 "Fast lane to a Mercedes for every season".*
Alan Copps, Aug. 12, 1995 "Fast lane to a Mercedes for every season" pp. 1-3.*
*The Buyer's Guide to Fractional Aircraft Ownership*, brochure, 2001.
Carey, Susan. "More Fliers Decide that 1$^{st}$ Class Just Isn't Good Enough." *The Wall Street Journal*, Apr. 23, 2002.

(Continued)

*Primary Examiner*—James P Trammell
*Assistant Examiner*—John A Anderson
(74) *Attorney, Agent, or Firm*—Richard M. Goldberg (57) ABSTRACT

A method for leasing multiple vehicles, including the steps of compiling information as to vehicles available for leasing and time periods in which the vehicles are available for leasing; presetting at least one group of N vehicles from the compiled information; setting a total lease term for each group of N vehicles; dividing the total lease term into P sub-lease terms; selecting a plurality of M individuals for leasing the vehicles in each group, where N, P and M are integers and M is less than or equal to N; calculating lease costs for leasing each vehicle in each group for each sub-lease term; entering into a lease agreement with each individual for leasing a plurality P of the vehicles in the P sub-lease terms for a preset one of the groups of N vehicles; and removing the selected vehicles from the compiled information.

19 Claims, 3 Drawing Sheets

OTHER PUBLICATIONS

Clements, Michael. "Oxford Cashes in on Car Leases." *USA Today Online*. May 26, 1994.
Donovan, Aaron. "May I borrow the car? New service says yes." *The New York Times*, Mar. 1, 2002.
Gaudette, Karen. "City Dwellers Turn to Car Sharing." *AP Online*. Apr. 24, 2002.
Harris, Donna. "Web site allows consumers to transfer leases," *Aotomotive News*, Apr. 30, 2001.
Irwin, Neil. "Wheels, Whenever: Two Car-Sharing Services Offer Area Rentals by the Hour." *The Washington Post*, Mar. 26, 2002.
James, Natalie. "Perish the Thought: North Americans May Share Cars." *Reuters*. Sep. 24, 1998.
"Lease Sharing." *Farm Industry News*. Sep. 1, 2002.
Patty, Mike. "Sharing the Wheels Boulder Carshare Members Going Dutch on the Clutch." *Denver Rocky Mountain News*. Mar. 11, 2002.
Siegel, Robert et al, "Car Sharing," *All Things Considered* (*NPR*), Aug. 4, 1998.
Stringer, Kortney. "An Even Better Car Deal: You Don't Have to Own One." *The Wall Street Journal Online*, Dec. 26, 2002.
"Your Car or Mine?" *Environment*. Jan. 1, 2002.
Alan Copps. "Fast lane to a Mercedes for every season." Aug. 12, 1995.
Boatshare Australia downloaded from Boatshare.com, Jun. 27, 2008.
Exotic Car Share, http://www.exoticarshare.com, 5 pages, printed Jul. 13, 2004 from website.

* cited by examiner

FIG. 1

JAGUAR

XJ8   RED    5/1/01 - 7/1/01 ; 10/1/01 - 4/1/02
XJS   BLACK  8/1/01 - 12/1/01

FORD TAURUS
 BLUE         5/1/01 - 8/1/01 ; 10/1/01 - 12/1/01
 BROWN        7/1/01 - 9/1/01

FIG. 2

5/1/01 - 7/1/01
    XJ8   RED
    FORD TAURUS  BLUE

7/1/01 - 9/1/01
    FORD TAURUS  BROWN
    LEXUS  LS400  BLACK

METHOD AND SYSTEM FOR LEASING AND SHARING A GROUP OF GOODS BY A GROUP COMPOSED OF MATCHING NUMBER OF INDIVIDUALS INCLUDING THE SYSTEMATIC ROTATION OF THOSE GOODS BETWEEN THE LESSEES IN PREDETERMINED TIME SLOTS

REFERENCE TO RELATED APPLICATION

The present application is a continuation-in-part of U.S. patent application Ser. No. 09/873,686, filed Jun. 4, 2001 to the same inventor herein and entitled METHOD AND SYSTEM FOR LEASING GOODS.

BACKGROUND OF THE INVENTION

The present invention relates generally to a method and system for leasing goods, and more particularly, is directed to a method and system for a group of individuals to lease a matching number of vehicles so that the vehicles are transferred between the individuals in a systematic sequence that permits each individual to drive each vehicle in the group for a predetermined length of time and predetermined time slot and at a predetermined lease price.

Conventionally, there are four ways to obtain rights to drive a vehicle, namely, purchase, lease, rental or car share. The purchase of a vehicle generally requires high payments, since the entire vehicle is purchased in a short period of time, for example, three or four years. Vehicle rental generally occurs for a much shorter period of time, for example, a day or week, and would be cost prohibitive over a period of time of, for example, three years.

Car share is similar to very short term rentals of, for example, one hour to a weekend. The typical car share program involves groups of people who become members by paying a membership fee. They can then reserve time to use the car and pay an additional fee, based on the length of each individual use, on either an hourly or daily basis. However, use of the cars is relatively random in that there is no systematic rotation of vehicles between individuals in the group. This is because individuals reserve vehicles on an as needed basis. As a result, there may be times when vehicles are not being leased at all, and other times when one is unable to reserve a vehicle because all of the vehicles in the group have been reserved. There are also periods of time when vehicles are not in use, and consequently, are not fully utilized, whereby the lessor loses cost opportunity. The primary advantage of this system is for those persons who have relatively little use for a vehicle and desire access to a vehicle on an as needed basis, and are willing to pay accordingly. Thus, with this system, there is no matching of the number of vehicles available with the same number of people in the program, and no matching with the number of lease periods, that is, the system is a random system.

Conventional leasing of vehicles has become a popular option because it can be financially attractive. With a leased vehicle, there remains a residual value at the end of the lease. Accordingly, the payments are based on the difference between the purchase price and the residual value, thereby greatly reducing the monthly payments relative to the purchase of the vehicle.

However, a lease arrangement is limited to a single vehicle for the relatively long lease term. Thus, a lease arrangement is not designed to provide flexibility as to the types of vehicles that a person can drive, that is, the person is limited to driving a single vehicle during the lease term. A person can easily get tired of driving a single vehicle during a lease term and may prefer a wider range of choices.

Another problem with leasing is that the vehicles are returned to the vehicle dealership at the end of the lease term. The vehicle dealership must then attempt to sell the returned vehicles. Because of the large number of leased vehicles, there has been a glut of used vehicles that the dealership must now sell.

In earlier copending U.S. patent application Ser. No. 09/873,686, a method and system was disclosed in which an individual could lease multiple vehicles in sequence in a lease arrangement. Although this is easy to manage from the individual lessee's viewpoint, it can become difficult to manage for the lessor, particularly where there are a large number of vehicles and lessees. It can also result in a waste of cost opportunity where vehicles are not being leased.

OBJECTS AND SUMMARY OF THE INVENTION

Accordingly, it is an object of the present invention to provide a method and system for leasing multiple vehicles that overcomes the problems with the aforementioned arrangements.

It is another object of the present invention to provide a method and system for leasing multiple vehicles in sequence in a lease arrangement.

It is still another object of the present invention to provide a method and system for leasing multiple vehicles in which a user selects multiple vehicles to be driven, each for a short time period, during a conventional lease period.

It is yet another object of the present invention to provide a method and system for leasing multiple vehicles so that a person can experience driving a variety of different vehicles at a cost that is not cost prohibitive, including vehicles that the person would not normally lease.

It is a further object of the present invention to provide a method and system for leasing multiple vehicles in which an individual can experience driving a variety of different vehicles in a much shorter period of time than a conventional lease term.

It is a still further object of the present invention to provide a method and system for leasing multiple vehicles in which vehicle dealerships have the advantage of including used vehicles in the lease arrangement, thereby reducing the inventory of used vehicles returned at the end of a lease term.

It is a yet further object of the present invention to provide a method and system for leasing multiple vehicles which has the advantage of facilitating use of more environmentally friendly cars such as battery/electric operated cars on the road.

It is another object of the present invention to provide a method and system for leasing multiple vehicles by combining a group of people together to lease a matching number of vehicles, in which the vehicles are transferred between the individuals in the group based on a preset length of time and in preset time frames that each vehicle will be driven and the preset lease payment for the right to drive these vehicles.

It is still another object of the present invention to provide a method and system for leasing multiple vehicles by combining a group of people together to lease a group of vehicles, in which the vehicles are transferred between the individuals in a systematic sequence that ensures that each individual in the group drives each vehicle in the group for a prearranged length of time and on a preset lease payment.

It is yet another object of the present invention to provide a method and system for leasing multiple vehicles by matching a group of prospective lessees with a matching number of vehicles and a matching number of predetermined time slots in a systematic car rotation sequence that ensures that each individual in the group drives each vehicle in the group for a prearranged length of time and on a preset lease payment based on the value of the vehicle and the length of time that each vehicle is driven.

It is a further object of the present invention to provide a method and system for leasing multiple vehicles by matching a group of prospective purchasers with a matching number of vehicles and a matching number of predetermined time slots in a systematic car rotation sequence that ensures that each individual in the group drives each vehicle in the group for a prearranged length of time and on a preset lease payment based on the value of the vehicle and the length of time that each vehicle is driven, and at the end of the predetermined time periods, each vehicle is disposed of by either selling the vehicle to a third party and splitting the proceeds between the purchasers or by selling the vehicle to an individual in the group who pays the other members of the group their respective values of the vehicle, or as in a conventional lease, the vehicle reverts to the dealership or lessor to dispose.

In accordance with an aspect of the present invention, a method for leasing multiple vehicles, includes the steps of, prior to entering into a lease agreement, compiling information as to vehicles available for leasing and time periods in which the vehicles are available for leasing, presetting at least one group of N vehicles from the compiled information, where N is a non-infinite integer, setting a total lease term for each group of N vehicles, dividing the total lease term into P sub-lease terms, where a non-infinite is an integer greater than one, selecting a plurality of M individuals for leasing the vehicles in each group, where M is a non-infinite integer less than or equal to N, and calculating lease costs for leasing each vehicle in each group for each sub-lease term; entering into a lease agreement with each individual of the selected M individuals for leasing a plurality of the N vehicles in the P sub-lease terms for a preset one of the groups of N vehicles; and revising the compiled information to remove the selected vehicles in the selected time periods from the compiled information.

In one embodiment, M and N are the same integer. In such case, P, M and N can be the same integer, or P can be less than N. Further, the sub-lease time periods are preferably each of equal duration during the total lease term, or at least some of the sub-lease time periods can be made to be of different durations during the total lease term.

In one embodiment, at least one vehicle in each preset group of N vehicles is an energy efficient vehicle, and/or an environmentally friendly vehicle.

In another embodiment, the N vehicles in each group are owned by the M individuals of each group. In such case, the vehicles in each group are sold at the end of the total lease term and the proceeds from the sale are split between the M owner individuals of each group.

In accordance with another aspect of the present invention, a system for leasing multiple vehicles, includes a storage medium containing compiled information as to vehicles available for leasing and time periods in which the vehicles are available for leasing; an input device for inputting information; a central processing unit connected with the storage medium and the input device; one of the input device and the central processing unit, prior to entering into a lease, presetting at least one group of N vehicles from the compiled information, where N is a non-infinite integer, setting a total lease term for each group of N vehicles, dividing the total lease term into P sub-lease terms, where P is a non-infinite integer greater than one, and selecting a plurality of M individuals for leasing the vehicles in each group, where M is a non-infinite integer less than or equal to N; the central processing unit, prior to entering into a lease, calculating lease costs for leasing each vehicle in each group for each sub-lease term; and an output device for supplying a copy of a lease agreement with each individual of the selected M individuals for leasing a plurality of the N vehicles in the P sub-lease terms for a preset one of the groups of N vehicles, whereupon the central processing unit revises the compiled information to remove the selected vehicles in the selected time periods from the compiled information.

A monitor is connected with the central processing unit for displaying the compiled information and results of the calculation.

The central processing unit calculates the lease costs for each selected vehicle in each sub-lease term, and then calculates total lease costs to each individual in each group for the total lease term based on the calculated lease costs for each selected vehicle in each sub-lease term.

The above and other objects, features and advantages of the invention will become readily apparent from the following detailed description thereof which is to be read in connection with the accompanying drawings.

DETAILED DESCRIPTION

Figure 1:
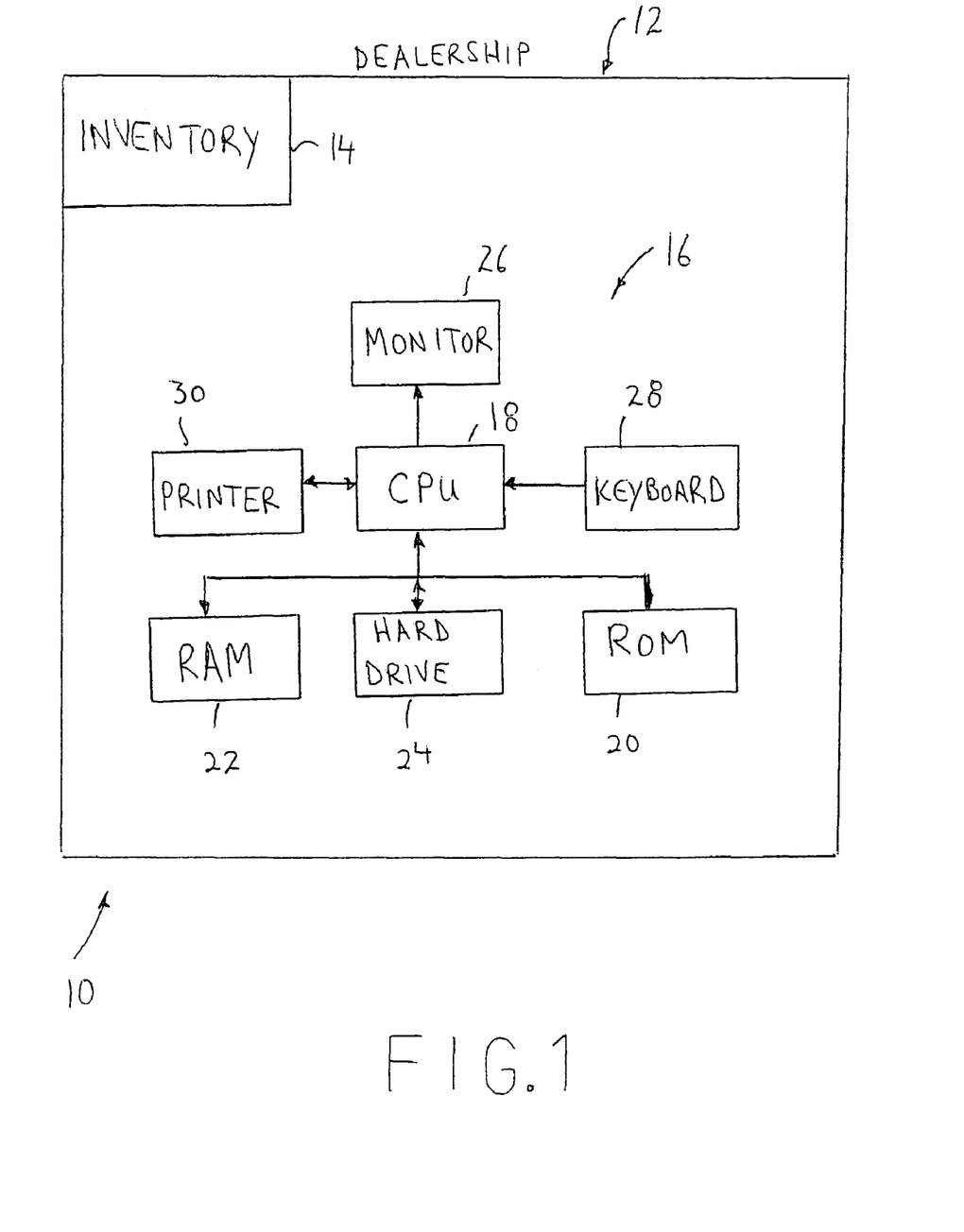
FIG. 1 is a block diagram of a system according to the present invention.

Referring to the drawings in detail, and initially to FIG. 1 thereof, the system of earlier copending U.S. patent application Ser. No. 09/873,686 will first be discussed. Specifically, a system 10 according to the present invention provides that a vehicle dealership 12 include an inventory 14 of vehicles, such as cars, trucks, vans, minivans, motorcycles, recreational vehicles (RVs), motor homes, etc. and even other vehicles such as boats and planes. Reference to dealership 12 is intended to cover a specific vehicle dealership 12 at a specific location, a leasing agency, a vehicle manufacturer, a membership club, an organization leasing over the Internet, etc. Inventory 14 can be provided on the dealership lot, a pool of vehicles at various locations, or can merely be accessible by dealership 12 from other dealerships, the manufacturer or the like.

Vehicle dealership 12 includes a computer system 16 having a central processing unit (CPU) 18 with a read only memory (ROM) 20 for storing a permanent operating system, a random access memory (RAM) 22 acting as a working memory and a hard drive 24 for storing records as to the vehicles in inventory 14 as well as temporary operating systems and programs for use with the present invention, such as lease generating and cost calculating programs. A monitor 26 is connected to CPU 18 for viewing required information, and a keyboard 28 is also connected with CPU 18 for inputting information. A printer 30 is connected with CPU 18 for printing out various documents.

With the above arrangement, based on input from keyboard 28, voice recognition system, etc., a person can lease vehicles from inventory 14. Specifically, unlike a conventional lease arrangement where a person leases a single vehicle over a period of time of, for example, three years, with the present invention, a person can lease a plurality of vehicles sequentially over the same time period in a single lease arrangement. This lease may include different types of vehicles, such as motorcycles during one time period, followed by automobiles during the next time period, etc. In such case, various factors must be determined by CPU 18, such as the period of use by the person for each vehicle under the lease, the availability of vehicles from the dealership inventory 14, the periodic cost to the person leasing the vehicles, vehicle maintenance, etc.

Because of the large number of people using such lease arrangement, it is necessary for dealership 12, via CPU 18, to make these determinations and provide the maximum utilization of the vehicles in inventory 14, as well as satisfying the vehicle choices and terms, to the extent possible, of all individuals leasing the vehicles.

Various options can be provided by dealership 12. For example, leases can be made to start on a quarterly or monthly basis, so as to avoid any time in which a vehicle sits on a dealership's lot without being leased. However, some time may need to be provided, even a few days between dropping off and picking up of leased vehicles, during the transfer in order for dealership 12 to service the vehicles. In such case, loaner vehicles may have to be provided for a day or two to each person to provide such servicing time. Alternatively, leases can start randomly. This provides the greatest flexibility to the individuals leasing the vehicles, but also provides the largest down time for the leased vehicles whereby the vehicles can sit on a dealership's lot for longer periods without being leased. A more practical way which presents a middle ground between the above two options is to stagger the leases by a few days. This gives the dealership time to service the vehicles and present the same to a new person with the least down time.

Dealerships can enhance their relationships with customers and offer greater value because the dealerships are not just selling a commodity, but rather, are offering a service in terms of a variety of vehicle choices, vehicle maintenance, loaner vehicles and other related services.

As to the periodic lease payments that must be paid by the individuals, these would be determined by a number of factors, including the total lease term, the period of time during which each vehicle is driven during the total lease term, the type of vehicle driven in each period, and related items such as vehicle maintenance, insurance based on the vehicle and the period during which each vehicle is driven, the delivery method to the individual, taxes, title registration, surcharges for selecting the sequence of driven vehicles, etc. Other factors would be the mileage of the vehicles, the mileage that is permitted within each time period for each vehicle, extra features on the vehicles, loaner vehicles available during transfer of vehicles during successive time periods, maintenance programs, seasonality, home delivery versus pick up at the dealership, and the like. Factors affecting the price of the lease could include predetermined or post adjustments to the lease price for driving less than or more than the prescribed mileage per vehicle. The condition of the vehicle at the end of the sub lease term could affect the lease price for the next period or a one-time charge could be assessed. Price adjustments could also be assessed based on, for example, driving vehicles in preferred seasons, for example, a convertible in summer or conversely a discount for driving a convertible in winter. Price adjustments could also be made if, for example, widely divergent vehicles were in the same group. For example, if two individuals selected a Cadillac and a low-end Chevrolet to lease and share. In this case, the privilege of driving a new Cadillac first and an older Chevrolet late in the lease period may warrant a higher price than driving a new Chevrolet early in the lease period and an older Cadillac later in the lease period. Preferably, the total lease term is in the range of three months to five years. The period of time during which each vehicle is driven during the total lease term and the type of vehicle driven in each time period would be the primary factors in determining the lease cost.

The periodic lease payments can be paid in a number of different ways. Specifically, for each time period during the lease term during which a different vehicle is driven, there would be different costs associated therewith. For example, a person driving a Jaguar for a two month period would pay more, for example, $800.00 per month, than for a Ford Taurus for a two month period, for example, $200.00 per month. In this case, the monthly payments could be determined so as to be based on the vehicle then being driven, so that the person would pay $800.00 per month for two months, and then pay $200.00 per month for two months. Alternatively, and preferably, the payments would be smoothed out over the entire lease term so as to be constant. In this case, the payments during the four months would be $500.00 per month, that is, ($800.00+$800.00+$200.00+$200.00)/4. In this manner, a person could have the luxury of driving a high end vehicle such as a Jaguar at a much reduced price over what the person would normally pay for a single Jaguar lease over a thirty-six month conventional lease. Also, the person can test drive numerous different vehicles in order to make a determination as to which vehicle to eventually purchase. For example, this permits a person to use a battery/electric operated car for a short term of three to six months. This would facilitate use of more environmentally beneficial vehicles on the road without requiring a person to make a long term commitment to a vehicle which commonly has poorer performance and limited distance it can travel. Alternatively, the person can pay a lump sum single payment for the entire lease term.

Alternatively, the dealership can offer a set price for predetermined vehicles, so that the calculation would have already been made at the dealership. For example, a person can lease one car from group A, a second car from group B and so on, and can even make the determination at the start of each new time period, but preferably this determination is made sufficiently far in advance of the start of the lease term.

Further, people tend to be more conservative as to colors and styles of vehicles when purchasing vehicles. The present lease arrangement would enable manufacturers to provide more unconventional designs and colors, since people may take a short term lease on unusual vehicles that they would be reluctant to own for a longer period.

It will be appreciated that the periods during each lease can vary in duration as well. For example, it is possible to lease a Jaguar for one month, followed by a Ford Taurus for four months. This will enable the individual to sample the Jaguar while substantially reducing the lease costs. However, the preferred embodiment is where all lease time periods for all cars within a specific group of cars to be leased, are equal.

The person could also pay a premium surcharge for the right to select the sequence in which the person would be able to drive each vehicle. This could be determined by the individual or by CPU 18 at dealership 12. The region in which the vehicles are available can also be a factor as to availability and cost in order to effectively transfer the vehicles to the individuals under the lease agreement.

It is also possible to lease by region. For example, a retired person who lives in a northern region for six months and a southern region for six months could have a six month period in each region under the same lease.

The dealership could also offer incentives in order to better reduce the number of vehicles in its inventory 14. For example, if the dealership has a glut of Ford Taurus vehicles, dealership 14 could offer a discount during certain periods of the lease to reduce this glut, thereby optimizing the leasing of the vehicles. In this same regard, dealership 14 could offer premiums at higher lease prices, for example, for convertibles during summer months, or seasonal incentives at lower lease prices, for example, for convertibles during winter months. Other incentives such as frequent flier miles, dollar savings and the like could be offered in order to encourage individuals to use certain vehicles at certain times in order to manage and optimize the utilization of vehicles.

Thus, it is only necessary for the individual to select the vehicles to be driven during the lease term and the periods in which the vehicles are driven. The vehicles can also be selected on whether they are new or used, mileage requirements and other factors. Based on this information and based on the availability of vehicles, CPU 18 will generate a lease agreement for the individual, which will be printed out by printer 30. Alternatively, an electronic signature can be used.

Figure 2:
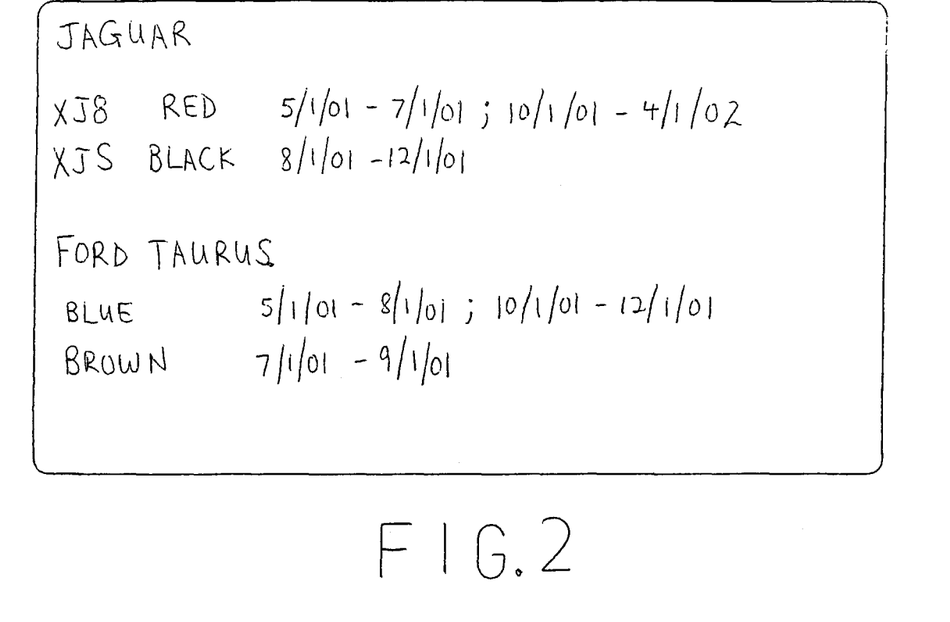
FIG. 2 is a plan view of a screen display on the monitor.

In order for the individual to select the vehicle, the individual can list his or her preferences which are input into the computer system via keyboard 28, and have CPU 18 determine availabilities. For example, in such case, the individual might select a Jaguar XJ8 from May 1, 2001 to Aug. 1, 2001, followed by a Ford Taurus from Aug. 1, 2001 to Nov. 1, 2001. However, as shown in FIG. 2 as to availability of vehicles which can be displayed on monitor 26, these vehicles are not available during that time. CPU 18 can then indicate this, and suggest alternative leasing options, such as a blue Ford Taurus from May 1, 2001 to Aug. 1, 2001, followed by a Jaguar XJS from Aug. 1, 2001 to Nov. 1, 2001, or alternatively, a Jaguar XJS from Aug. 1, 2001 to Oct. 1, 2001 and a Jaguar XJ8 from Oct. 1, 2001 to Nov. 1, 2001. CPU 18 can also suggest alternate time periods, for example, May 1, 2001 to Jul. 1, 2001, Jul. 1, 2001 to Sep. 1, 2001 and Sep. 1, 2001 to Nov. 1, 2001.

Figure 3:
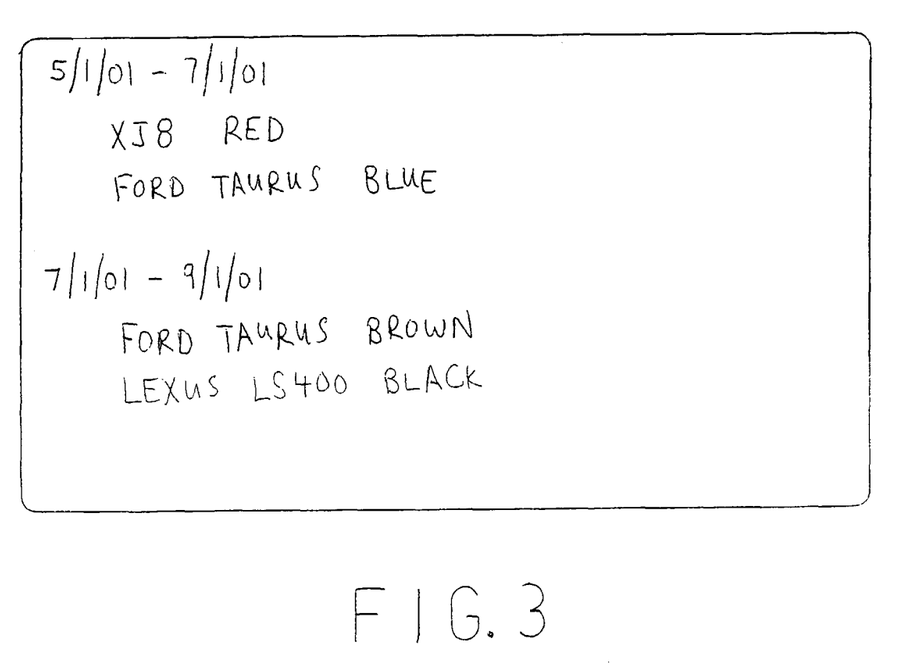
FIG. 3 is a plan view of a different screen display on the monitor.

Alternatively, rather than having CPU 18 calculate the above for the time periods and vehicles, the person can select the vehicles. In this regard, the screen of FIG. 2 can be displayed on monitor 26 for each vehicle, so that the person can manually select the vehicle and then determine the period of availability. Also, this manual selection can occur with paper records rather than being displayed on the screen of FIG. 2. Alternatively, CPU 18 can be instructed to display the screen of FIG. 3 in which, rather than displaying inventory 14 by vehicle, monitor 26 displays inventory 14 by availability in different time periods. Although the time periods of two months are shown, any other suitable time period, for example, one month, three months, etc. can be displayed, and the time periods can start from any day in the month, rather than the first day of the month.

Figure 4:
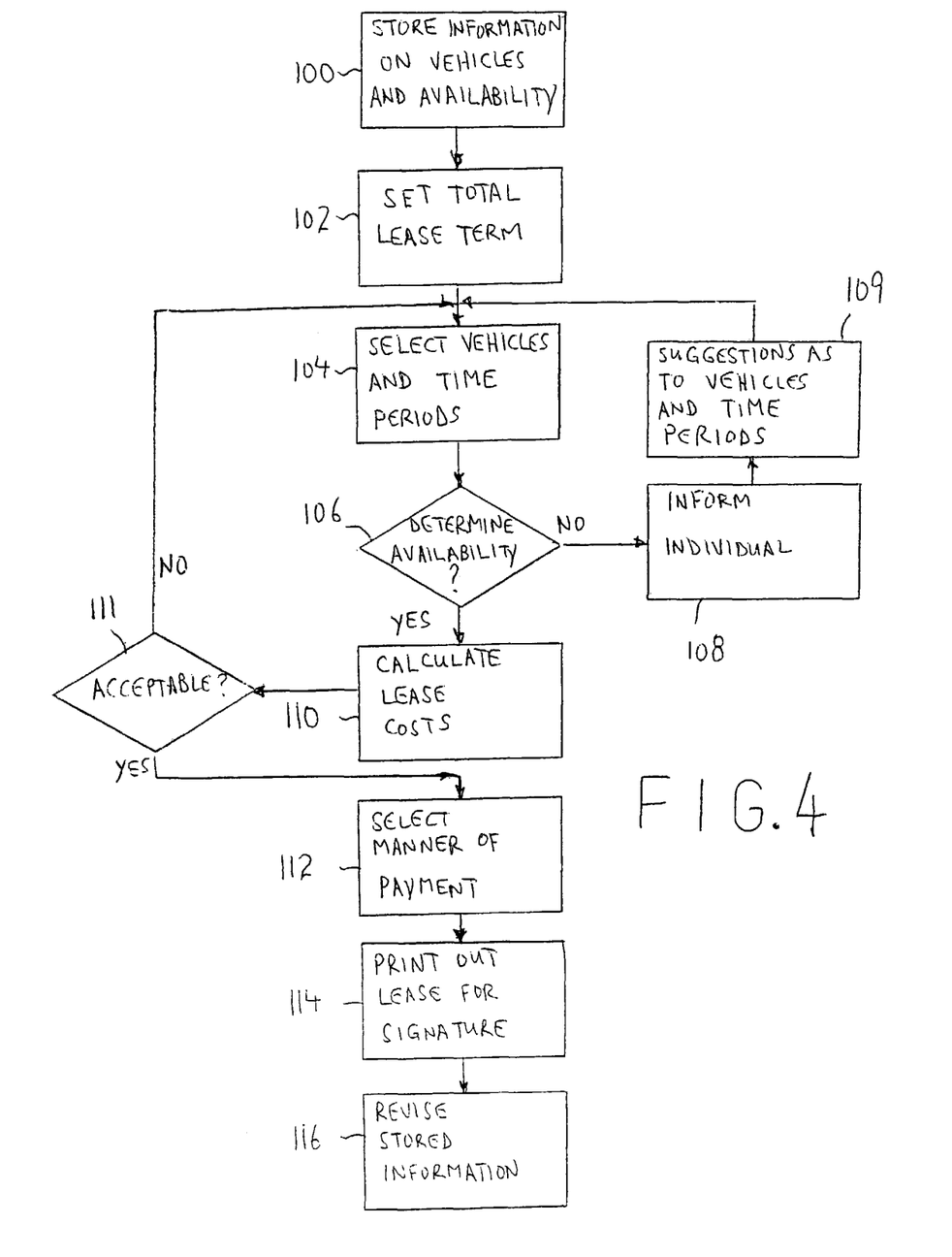
FIG. 4 is a flow chart diagram of the steps of the method according to the present invention.

Referring now to the flow chart of FIG. 4, the steps of the method according to the present invention will now be described. In step 100, dealership 12 stores information as to the vehicles that are available for lease and the time periods during which each vehicle is available. In step 102, the individual and/or dealership then sets the total lease term, for example, three years, although the present invention is not limited to this term. The vehicles to be driven during the lease term and the time period during which each vehicle is to be driven, are then selected in step 104. As discussed above, this can occur by CPU 18 or by the individual. The person can also select a priority or sequence of time periods in which the different vehicles are driven in step 104. In the next step 106, it is determined if the selected vehicles are available during the selected time periods. In the case of CPU 18 performing the selection operation, the answer would always be YES. However, the individual may perform the selection operation after viewing the screens of FIG. 2 and/or FIG. 3. If all of the selected vehicles and/or time periods are not available, the answer is NO in step 106 and the process continues to step 108 where the person is informed of the same, and then the process returns to step 104 where a new selection of vehicles and/or time periods can be made. An optional step 109 can be provided between steps 108 and 104 where CPU 18 provides various suggestions as to alternative vehicles and/or time periods to optimize utilization of the fleet of vehicles in inventory 14. For example, longer or shorter time periods and/or proposing similar alternative vehicles could be provided.

If the answer in step 106 is YES, the process continues to step 110 where CPU 18 determines the lease terms and calculates the lease costs. Alternatively, step 102 can occur after step 104 or step 110. Further, in step 111, if the lease costs are unacceptable, the process returns to step 104, and if they are acceptable, continues to step 112.

The individual then selects the manner of payment in step 112, for example, different monthly costs dependent upon the vehicle being driven or a constant monthly cost which is smoothed out over the entire lease term. The lease agreement is then printed out in step 114 for signature and is signed by the person. Alternatively, an electronic signature or other means of authorization can be used. Thereafter, in step 116, CPU 18 revises and updates the stored information on hard drive 24 as to vehicles and availability. In other words, the selected vehicles and times are removed from the availability list.

It will be appreciated that the steps need not proceed in the order above.

Accordingly, the present invention provides a method and system for leasing multiple vehicles in sequence in a single lease arrangement, whereby a user selects multiple vehicles to be driven, each for a short time period, during a conventional lease period. With the present invention, a person can effectively test drive different vehicles at a cost that is not prohibitive, and can experience driving a variety of different vehicles in a much shorter period of time than a conventional lease term. Further, vehicle dealerships have the advantage of including used vehicles in the lease arrangement, thereby reducing the inventory of used vehicles returned at the end of a lease term.

It will be appreciated that various modifications can be made to the present invention within the scope of the claims. For example, incentives could be provided so that if a particular vehicle is leased, a second vehicle is thrown in as a bonus for free. This could occur, for example, if a dealer has a glut of certain vehicles and wants individuals to include these particular vehicles in the lease agreement.

As a further modification, a lease agreement according to the present invention can include a lease for two or more vehicles leased simultaneously during a given time period of the lease term. This can occur, for example, where a family or business lease is desired. For example, a husband can lease one vehicle for different time periods of a lease term and a wife can simultaneously and in overlapping relation, lease another vehicle during the lease term. The second vehicle can be leased for the same or different time periods, and can even be leased for a different lease term.

Alternatively, a plurality of individual leases in sequence for the future could be used in place of the single lease of the present invention. In such case, preferably, all of the future leases are executed at the same time at the signing of the first lease, although they can be signed at different times during the lease period.

Alternatively, an agreement can be signed whereby the lessee agrees to execute a plurality of leases in sequence in the future, with the pricing being set at the time of the agreement.

Although the above method and system is easy to manage from the individual lessee's viewpoint, it can become difficult to manage for the lessor, particularly where there are a large number of vehicles and lessees. It can also result in a waste of cost opportunity where vehicles are not being leased.

For this reason, according to a modification of the same, a group of people are combined together to lease a preset group of vehicles, in which the vehicles are transferred between the individuals in the group based on a preset length of time that each vehicle will be driven and the preset lease payment for the right to drive these vehicles. Thus, the vehicles are transferred between the individuals in a systematic sequence that ensures that each individual in the group drives each vehicle in the group for a prearranged length of time and on a preset lease payment. In this regard, a group of prospective lessees are matched with a matching number of vehicles and a matching number of predetermined time slots in a systematic car rotation sequence that ensures that each individual in the group drives each vehicle in the group for a prearranged length of time and on a preset lease payment based on the value of the vehicle and the length of time that each vehicle is driven.

Matching a group of individual prospective lessees could be based on similar characteristics of preferences in addition to their interest in the same vehicles. For example, smokers and non-smokers, male and female, age, insurance risk, drivers with or without garages could all be characteristics in establishing a group to lease and share the same vehicles.

In accordance with the present invention, in order to obtain maximum utilization of the vehicles, the number of vehicles in each group is preferably equal to the number of individuals in each group. However, the present invention is not limited thereby.

In order to better understand the present invention, the following examples are provided.

Example 1

In the first example, the number of vehicles and lease periods are preset for the group, with the number of individuals matching the number of vehicles and lease periods during the entire lease term. For example, if the lease period is three years, with three lease segments of one year each, it will be necessary to match three individuals with three preselected vehicles. If there are more than three vehicles and/or more than three vehicles in this situation will result in mismatches in which there will be scheduling problems, such that an individual will be unable to obtain a vehicle or there will be periods in which certain cars will not be utilized. The essence of this first example is that there is no variation, so that there are the same number of vehicles, lease periods and lessees.

As a specific example herein, we assume four preset groups A-D as follows:

| GROUP 1 | GROUP 2 | GROUP 3 | GROUP 4 |
| --- | --- | --- | --- |
| Ford Taurus | Jeep | Mercedes | Chrysler |
| Lexus | Nissan | Chevrolet | BMW Z-3 |
| Ford F-150 | Windstar | Cadillac | Volvo |

With this arrangement, there would be twelve individuals A-L, and each individual would choose which Group 1-4 to belong, and this individual would be one of three individuals in that group. For example, individual A might select Group 2, individual B might select Group 3, individual C might select Group 2, and so on, until there are three individuals for each Group 1-4. If we assume that individuals A, C and K are the three individuals in Group 2, then the individuals can be selected to drive the vehicles on a basis as follows:

| Year | A | B | C |
| --- | --- | --- | --- |
| 1 | Jeep | Nissan | Windstar |
| 2 | Windstar | Jeep | Nissan |
| 3 | Nissan | Windstar | Jeep |

As a result, all of the vehicles in each group would be leased, and there would be no scheduling problems. Further, the lessor, which may be a car dealership, could match the individuals with the groups months before the start of the lease term, thereby also removing any worry by the dealership as to non-leased vehicles and also removing any worry by the individuals as to the vehicles to be leased. The individuals also have some flexibility as to the vehicles to be leased by selecting the appropriate group.

Example 1 therefore represents the case where there are N vehicles per group, M individuals per group and P lease segments, where M, N and P are equal integers.

It will be appreciated that the groups of cars can contain different manufacturers, or cars all of the same manufacturer but differing in category type, such as sports cars, luxury cars, SUVs, etc.

Example 2

It is also possible to provide a greater selection of vehicles in a group. For example, a group may include N vehicles and M individuals, but there may be less than N lease segments P. The following illustrative example explains this modification.

Specifically, assume that there are two groups 1 and 2, each group having five vehicles as follows, so that N equals five:

| Group 1 | Group 2 |
| --- | --- |
| Taurus | Windstar |
| Lexus | Chevrolet |
| Ford F-150 | Cadillac |
| Jeep | Chrysler |
| Nissan | Volvo |

It is also assumed that the same number of individuals are in each group, that is, five individuals A-E in group 1 and five individuals F-J in group 2, so that M equals five.

However, the lease for each group is three years, with three one year periods, so that P equals three. In such case, each individual A has a choice of three of the five vehicles in the respective group. Of course, scheduling becomes more difficult. Therefore, from a management perspective, ideally there should be no more than ten vehicles per group. One example for scheduling is as follows:

| | Taurus | Lexus | Ford F-150 | Jeep | Nissan |
| --- | --- | --- | --- | --- | --- |
| $1^{st}$ yr. | A | B | C | D | E |
| $2^{nd}$ yr. | B | C | D | E | A |
| $3^{rd}$ yr. | C | D | E | A | B |

In this case, all of the vehicles are utilized during the lease term, and each person does not drive each vehicle, but only three of the five vehicles. It is therefore to the advantage of the individuals to sign up early for a group so that the individual has the first selection of vehicles in that group, which provides an incentive for early filling up of the group. For this reason, the lessor can require a group to be filled up a predetermined time before the lease term starts, and if not, the lessor has the option of canceling the group or reorganizing the group with different vehicles and/or different individuals. Alternatively, the lessor can extend the time that the lease term starts in order to fill the group.

It will be appreciated that the present invention is not limited to the number of groups, the number of vehicles in a group, the number of individuals in each group or the number of time periods in the lease which are given in the above examples.

Further, it may be that there are less than N individuals available for a group of N vehicles, that is, M is less than N. In such case, the lessor can remove one of the vehicles from the group, making the number of individuals equal to the number of vehicles in the group. Alternatively, the lessor can determine that, from a practical standpoint, it may be best to leave the N vehicles in the group and have less than N individuals in the group, since it may be impossible or impractical to obtain another individual for that group.

The vehicles in each group can be selected to be of the same type, or alternatively, can be of different types, for example, one luxury car, one sports car and one sport utility vehicle (SUV).

Further, the lessor can require that at least one vehicle in each group be an energy efficient vehicle and/or environmentally friendly vehicle, such as a battery/electric operated car. This would facilitate use of more environmentally beneficial vehicles on the road without requiring a person to make a long term and expensive commitment to a vehicle which commonly has poorer performance, limited distance it can travel and is relatively expensive. This method of leasing would reduce the individual burden of leasing these vehicles and facilitate sharing of the burden.

As a final alternative, a group of M prospective purchasers can be matched with a matching number of N vehicles and a matching number of predetermined P time slots or lease segments in a systematic car rotation sequence that ensures that each individual in the group drives each vehicle in the group for a prearranged length of time and on a preset lease payment based on the value of the vehicle and the length of time that each vehicle is driven, and at the end of the total lease time, each vehicle is disposed of by either selling the vehicle to a third party and splitting the proceeds between the purchasers or by selling the vehicle to an individual in the group who pays the other members of the group their respective values of the vehicle. Thus, and referring to Example 1, if individuals A-C purchased the three vehicles in Group A, with each driving each vehicle for one year, then the vehicles in the group would be sold at the end of the term, with the proceeds being split between the three purchasers. In the event that one of the individuals in the group purchases one of the vehicles, that individual must pay the other two individuals in the group one-third of the cost of the vehicle at such time. Alternatively, as in a conventional lease, the vehicles can revert to the dealership for disposal.

It will be appreciated that the groups can be set up with all new cars, all used cars or combinations of new and used cars. Thus, for example, a person could arrange to have a new car for each time period of the agreement if all new cars are present in the agreement.

Of course, the apparatus of FIG. 1 would be used in like manner with the above modifications.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A method for leasing multiple vehicles with a computer having a central processing unit, a memory for storing software and information, a keyboard for inputting data and a monitor, comprising the steps of:
   prior to entering into a lease agreement,
   compiling information with the computer as to vehicles available for leasing and time periods in which the vehicles are available for leasing;
   presetting at least one group of N vehicles from the compiled information, where N is a non-infinite integer;
   setting a total lease term for each group of N vehicles;
   dividing said total lease term into P sub-lease terms, where P is a non-infinite integer greater than one, with one vehicle of each group being leased during each sub-lease term;
   selecting a plurality of M individuals for leasing the vehicles in each group, where M is a non-infinite integer less than or equal to N, such that during the entire lease term, all M individuals have an obligation to use all vehicles of the group of N vehicles in all sub-lease terms;
   calculating lease costs with the computer for leasing each vehicle in each group for each sub-lease term;
   entering into a lease agreement with each individual of said selected M individuals for leasing a plurality of said N vehicles in said P sub-lease terms for a preset one of said groups of N vehicles; and
   revising the compiled information with the computer to remove the selected vehicles in the selected time periods from the compiled information.

2. A method according to claim 1, wherein M and N are the same integer.

3. A method according to claim 2, wherein P, M and N are the same integer.

4. A method according to claim 2, wherein P is less than N.

5. A method according to claim 1, wherein said sub-lease terms are each of equal duration during said total lease term.

6. A method according to claim 1, wherein at least some of said sub-lease terms are of different duration during said total lease term.

7. A method according to claim 1, wherein at least one vehicle in each preset group of N vehicles is one of: a) an energy efficient vehicle, and b) an environmentally friendly vehicle.

8. A method according to claim 1, wherein said N vehicles in each group are owned by the M individuals of each group.

9. A method according to claim 8, further comprising the step of selling the vehicles in each group at the end of the total lease term and splitting proceeds from said sale between the M owner individuals of each group.

10. A system for leasing multiple vehicles, comprising:
   a storage medium containing compiled information as to vehicles available for leasing and time periods in which the vehicles are available for leasing;
   an input device for inputting information;
   a central processing unit connected with said storage medium and said input device;

one of said input device and said central processing unit, configured prior to entering into a lease:

presetting at least one group of N vehicles from the compiled information, where N is a non-infinite integer, setting a total lease term for each group of N vehicles, dividing said total lease term into P sub-lease terms, where P is a non-infinite integer greater than one, with one vehicle of each group being leased during each sub-lease term, and selecting a plurality of M individuals for leasing the vehicles in each group, where M is a non-infinite integer less than or equal to N, such that during the entire lease term, all M individuals have an obligation to use all vehicles of the group of N vehicles in all sub-lease terms;

said central processing unit, configured prior to entering into a lease, calculating lease costs for leasing each vehicle in each group for each sub-lease term; and an output device for supplying a copy of a lease agreement with each individual of said selected M individuals for leasing a plurality of said N vehicles in said P sub-lease terms for a preset one of said groups of N vehicles, whereupon the central processing unit revises the compiled information to remove the selected vehicles in the selected time periods from the compiled information.

11. A system according to claim 10, further including a monitor connected with said central processing unit for displaying said compiled information and results of said calculation.

12. A system according to claim 11, wherein said central processing unit calculates the lease costs for each selected vehicle in each sub-lease term, and then calculates total lease costs to each individual in each group for said total lease term based on the calculated lease costs for each selected vehicle in each said sub-lease term.

13. A system according to claim 10, wherein M and N are the same integer.

14. A system according to claim 13, wherein P, M and N are the same integer.

15. A system according to claim 13, wherein P is less than N.

16. A system according to claim 10, wherein said sub-lease terms are each of equal duration during said total lease term.

17. A system according to claim 10, wherein at least some of said sub-lease terms are of different duration during said total lease term.

18. A system according to claim 10, wherein at least one vehicle in each preset group of N vehicles is one of: a) an energy efficient vehicle, and b) an environmentally friendly vehicle.

19. A system according to claim 10, wherein said N vehicles in each group are owned by the M individuals of each group.

* * * * *